United States Patent [19]

Sykes

[11] Patent Number: 4,651,460
[45] Date of Patent: Mar. 24, 1987

[54] FISHING LINE SIGNAL DEVICE

[76] Inventor: Willard D. Sykes, 5613 - 152nd St. North, Hugo, Minn. 55038

[21] Appl. No.: 885,469

[22] Filed: Jul. 14, 1986

[51] Int. Cl.$^4$ .............................................. A01K 97/01
[52] U.S. Cl. ................................................... 43/17
[58] Field of Search ...................................... 43/17, 16

[56] References Cited

U.S. PATENT DOCUMENTS

| D. 196,888 | 11/1963 | Pilsner | D72/1 |
|---|---|---|---|
| 2,654,176 | 10/1953 | Kachelski | 43/17 |
| 2,732,649 | 1/1956 | Tuttle | 43/17 |
| 2,811,802 | 11/1957 | Schmidt | 43/17 |
| 2,897,622 | 8/1959 | Belke | 43/17 |
| 2,924,038 | 2/1960 | Dahlgren | 43/16 |
| 2,995,854 | 8/1961 | Dixon | 43/17 |
| 3,060,616 | 10/1962 | Woodley | 43/17 |
| 3,352,048 | 11/1967 | Fleming | 43/17 |
| 3,545,118 | 12/1970 | Stelmach | 43/17 |
| 4,079,537 | 3/1978 | Chretien | 43/17 |
| 4,270,297 | 6/1981 | Yates | 43/17 |
| 4,285,154 | 8/1981 | Grahl | 43/17 |

Primary Examiner—Gene P. Crosby
Attorney, Agent, or Firm—Leo Gregory

[57] ABSTRACT

A fishing line signal device consisting of an elongated base plate having a reel mounted thereon and spaced from said reel is a cam faced pulley having a fish line wound thereabout and dropped therefrom into the water, a spring rod mast having a flag on the end thereof is retained in a bent over position by a projecting ledge against the cam face whereby a fish bite tugs the line sufficiently to rotate the pulley and move the mast to be free of the ledge and spring to an upright position signaling a bite.

3 Claims, 5 Drawing Figures

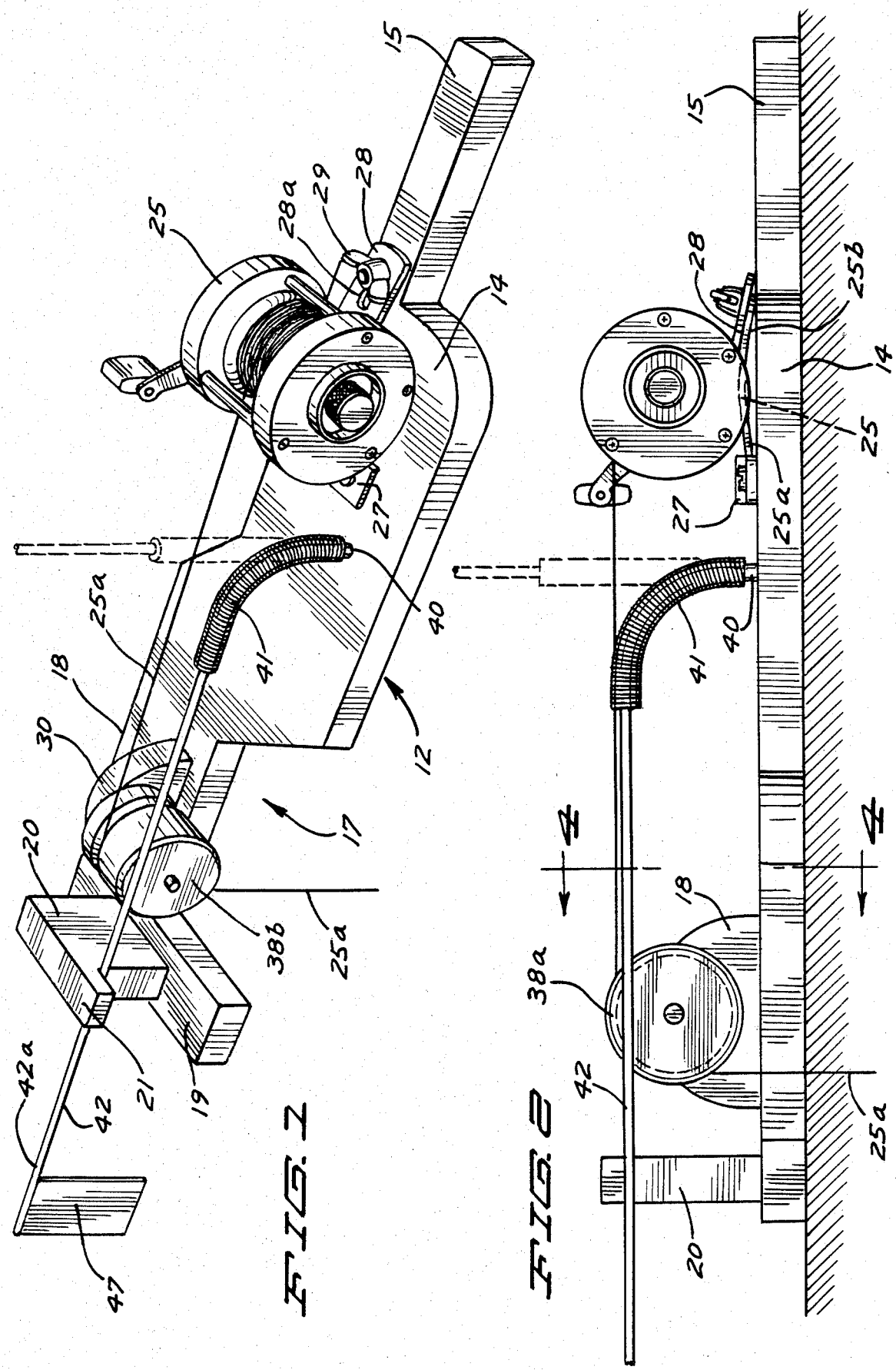

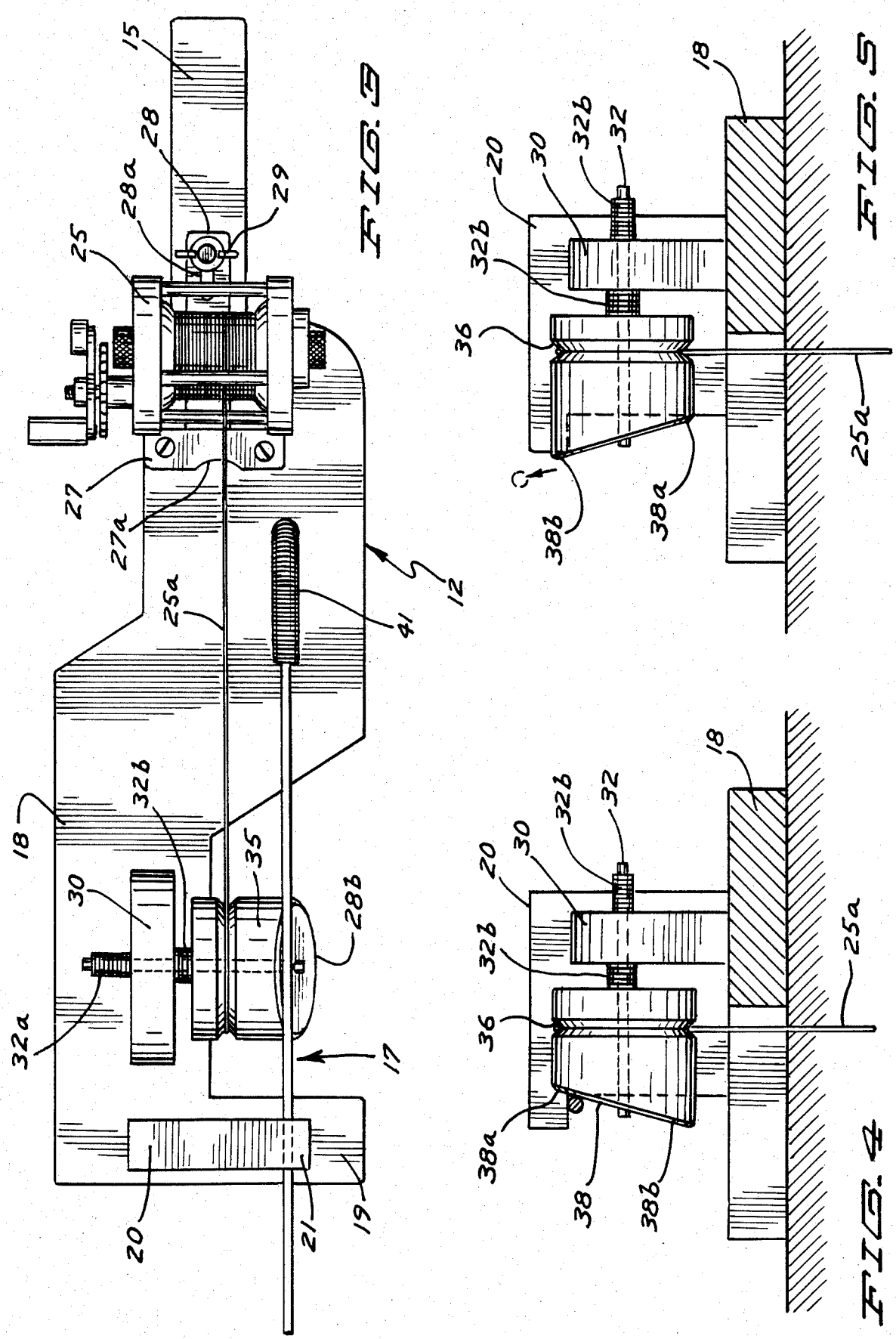

4,651,460

FISHING LINE SIGNAL DEVICE

BACKGROUND OF THE INVENTION

1. Field of Invention

This invention relates to a signal device for a fishing line.

2. Description of the Prior Art

Present in the art are a variety of devices intended to alert a fisherman that he has a bite on his line.

Dixon in U.S. Pat. No. 2,995,854 discloses a coiled spring which is released by a movement of the fishing line and it in turn releases a clapper arm to strike an alarm.

Tuttle in U.S. Pat. No. 2,732,649 discloses a flag carried on a rod bent under a keeper hook. Movement of the fishing line causes the reel to rotate and cause the release of the flag to spring upwardly.

Fleming in U.S. Pat. No. 3,352,048 shows a disc on a vertical axis. The disc has a trigger lip which when rotated releases a spring shaft having a flag thereon.

Pilsner in U.S. Pat. No. Des. 196,888 shows a cammed end of a shaft, which when rotated releases a spring rod carry a flag.

SUMMARY OF THE INVENTION

The invention herein discloses a simply constructed positive acting device which is activated by a fish pulling on a line in seizing the bait thereon and the pull on the line releases a signal device.

It is an object of this invention to provide a signal device for a fishing line consisting of an elongated plate member having a reel mounted at one end thereof, a pulley spaced from said reel having the line from said reel wound thereabout and thence dropped into the water, a spring rod having a flag thereon, means adjacent said pulley holding said rod in a bent over position and said pulley responsive to a pull on said line causes the release of said rod to elevate said flag.

It is a further object to have said reel removably attached to said board.

It is also an object of this invention to have said spring rod removably attached to said board.

These and other objects and advantages of the invention will be set forth in the following description made in connection with the accompanying drawings in which like reference characters refer to similar parts throughout the several views.

BRIEF DESCRIPTION OF THE DRAWINGS

FIG. 1 is a view in perspective;

FIG. 2 is a view in side elevation;

FIG. 3 is a top plan view;

FIG. 4 is a view in vertical section taken on line 4—4 of FIG. 1 as indicated; and FIG. 5 is a view similar to FIG. 4 in an alternate operating position.

DESCRIPTION OF A PREFERRED EMBODIMENT

Referring to the drawings, the device herein is indicated generally by the reference numeral 10. With particular attention to FIGS. 1 and 3, said device comprises a base plate 12 which may be formed of any suitable fairly light weight rigid material such as wood or plastic. Said base is an elongated plate member having a rear end portion 14 having a handle 15 projecting rearwardly thereof and having an angled offset portion 16 extending forwardly thereof having a cut out portion 17 therein and forming an end portion 19 having an angled keeper 20 upstanding therefrom, said keeper here being shown having a forwardly projecting ledge 21 extending transversely of said base member and forming a retaining member.

Said cut out portion 17 forms a fairly narrow neck portion 18.

Removably mounted on said base member just forward of said handle 15 is a conventional type of reel 25 retained by a bracket 27 here shown formed as a transverse strap having an upwardly upset central portion 27a receiving the forward portion 25a of the mounting plate 25 of said reel and a slotted rear retaining plate 28 overlies the rear extension 25b of said mounting plate and is secured by a thumb screw 29. The slot indicated by 28a permits the plate 28 upon being loosened to be withdrawn sufficiently for the removal of the reel 25.

Upstanding upon said neck portion 18 is a support block 30 having a shaft 32 journaled therein extending transversely thereof to have a pulley 35 mounted thereon, said pulley being substantially in alignment with said reel. Said pulley projects over said cut out portion 17. Said pulley has a V-groove 36 thereabout. The outer end face 38 of said pulley is slanted or cammed to provide an outer surface which is angled such as at 30°. Said shaft is secured by a coiled spring retainer 32a and is spaced from said block 30 by a spacer 32b.

Mounted upon said base plate 12 forward of said reel 25 is a post 40 and upstanding therefrom connected thereto by a coiled spring sleeve 41 is a spring rod 42 having a flag 43 mounted onto its upper end 42a.

With reference to FIGS. 4 and 5, the cam face 38 of said pulley 35 has a receding portion of its face 38a and a projecting portion thereof 38b.

The reel 25 is equipped with a fishing line 25a.

In operating position, the fishing line is readied to drop into a body of water for fishing purposes and preparatory to so doing, the line at an appropriate distance from its baited end is wound once or twice around the groove 36 of said pulley 35. Then the baited end is dropped into the body of water. Next the rod 42 is bent forwardly at its spring sleeve 41 and is retained under the keeper 20. In this position of the rod 42, the face 38 of said pulley 35 is rotated to have its receding portion 35a uppermost. The face 35 of said pulley is so angled that there is a clear access line for said rod to be engaged under said keeper 20. However, the angle of said face of said pulley is such that upon rotation of said pulley, the face portion 35b in moving upwardly will nudge or displace said rod sufficiently to move it outwardly from under the keeper 20, to release it to spring upwardly with the flag at the upper end thereof alerting the fisherman that there is a fish biting on his line.

It will of course be understood that various changes may be made in the form, details, arrangement and proportions of the product without departing from the scope of the invention which, generally stated, consists in a product capable of carrying out the objects above set forth, such as disclosed and defined in the appended claims.

What is claimed is:

1. A fishing line signal device having in combination
a base plate member,
a fishing reel mounted onto said plate,
a pulley, means mounting said pulley unto said base plate outboard thereof and forwardly of said reel,
a groove about said pulley,
a rod, intermediate said reel and said pulley, upstanding from said base plate bendable forwardly across the upper facing portion of said pulley,
retaining means carried by said base plate forwardly of said pulley engaging said rod in its forwardly bent position,
said pulley having an angled outer end facing surface portion such that in one circumferential position of said pulley the upper portion of said end facing surface provides a clear path for said rod to become engaged by said retaining means and in an alternate circumferential position of said pulley, the upper portion of said end facing surface projects to extend into said clear path to cause disengagement of said rod from said retaining means, and
a line from said reel being wound about said pulley and dropped therefrom to position the bait thereon into a fishing position.

2. The structure of claim 1, including
means removably securing said reel.

3. A fishing line signal device having in combination an elongated base plate member,
a reel having a line thereon,
a clamp removable securing said reel to said base plate member,
a cut out portion in said base plate remote from said reel,
an axially elongated pulley having an end outward facing portion,
means mounting said pulley onto said base plate member to overhang said cut out portion,
retaining means adjacent the side of said pulley remote from said reel,
a flexible rod upstanding from said base plate member adjacent said reel, said rod being bendable across said end facing portion of said pulley to be engaged by said retaining means,
a flag carried at the upper end of said rod,
said end facing portion being such that in one circumferential position it provides clearance for said rod to be engaged by the retaining means and in another circumferential position said end facing portion causes said rod to be urged outwardly to be free of said retaining means whereby said flag is raised upwardly and
means retaining said line wound around said pulley,
whereby a tug on said line causes said pulley to rotate.

* * * * *